United States Patent [19]
Hoarty et al.

[11] Patent Number: 5,812,665
[45] Date of Patent: Sep. 22, 1998

[54] SWITCHED CHANNEL SYSTEM

[75] Inventors: W. Leo Hoarty, Morgan Hill; Gary M. Lauder, Atherton, both of Calif.; Ted E. Hartson, Scottsdale, Ariz.

[73] Assignee: ICTV, Inc., Los Gatos, Calif.

[21] Appl. No.: 660,477

[22] Filed: Jun. 7, 1996

[51] Int. Cl.[6] .......................... H04N 7/173; H04N 7/167
[52] U.S. Cl. .............................. 380/10; 380/15; 455/4.1; 455/4.2; 348/7
[58] Field of Search ................................ 380/10, 20, 15; 455/4.1, 4.2, 6.1, 6.2

[56] References Cited

U.S. PATENT DOCUMENTS

| | | | |
|---|---|---|---|
| 3,889,050 | 6/1975 | Thompson | 178/5.1 |
| 4,081,831 | 3/1978 | Tang et al. | 358/114 |
| 4,245,245 | 1/1981 | Matsumoto et al. | 358/122 |
| 4,253,114 | 2/1981 | Tang et al. | 358/114 |
| 4,302,771 | 11/1981 | Gargini | 358/86 |
| 4,367,557 | 1/1983 | Stern et al. | 455/4 |
| 4,466,017 | 8/1984 | Banker | 358/120 |
| 4,471,380 | 9/1984 | Mobley | 358/120 |
| 4,484,217 | 11/1984 | Block et al. | 358/84 |
| 4,523,228 | 6/1985 | Banker | 358/120 |
| 4,538,174 | 8/1985 | Gargini et al. | 358/86 |
| 4,538,176 | 8/1985 | Nakajima et al. | 358/86 |
| 4,567,517 | 1/1986 | Mobley | 358/120 |
| 4,670,904 | 6/1987 | Rumreich | 380/15 |
| 4,706,285 | 11/1987 | Rumreich | 380/14 |
| 4,709,418 | 11/1987 | Fox et al. | 455/612 |
| 4,718,086 | 1/1988 | Rumreich et al. | 380/20 |
| 4,769,833 | 9/1988 | Farleigh et al. | 379/105 |

(List continued on next page.)

FOREIGN PATENT DOCUMENTS

| | | |
|---|---|---|
| 1302554 | 6/1992 | Canada . |
| 0419137A2 | 3/1991 | European Pat. Off. . |
| 0477786A2 | 4/1992 | European Pat. Off. . |
| 63-33988 | 2/1988 | Japan . |
| 6054324 | 2/1994 | Japan . |
| WO 82/02303 | 7/1982 | WIPO . |
| WO 90/13972 | 11/1990 | WIPO . |

OTHER PUBLICATIONS

"A Comparison of Evolutionary Paths: Tapped Fiber vs. Fiber–Reinforced Coaxial CATV Systems", David Large, IEEE LCS Magazine, Feb., 1990.

"Video on Demand Without Compression—A Review of the Business Model, Regulation and Future Implication", Jack A. M. Van der Star, Patent Abstract.

"Alternative Technologies and Delivery Systems for Broadband ISDN Access", Jack Terry, IEEE Communications Magazine, Aug. 1992.

"Proposal for a Hub Controlled Cable Television System Using Optical Fiber", Clifford B. Shrock, IEEE Transactions on Cable Television, vol. CATV–4, No. 2 (Apr. 1979).

"The Smart Headend—A Novel Approach to Interactive Television", W. Leo Hoarty, Montreux International TV Symposium, Jun. 9, 1995.

"Distributed Switching for Data Transmission over Two–Way CATV", Saadawi, Tarke et al., IEEE Journal on Selected Areas in Communications, vol. SAC–3, No. 2, Mar. 1985.

*Primary Examiner*—Gilberto Barrón, Jr.
*Attorney, Agent, or Firm*—Bromberg & Sunstein LLP

[57] ABSTRACT

A switching apparatus and method for routing RF scrambled signals. One of a plurality of scrambled RF television information signals is selected. A processor assigns an output carrier frequency. The selected scrambled television information signal is output by the switching apparatus on the assigned output carrier frequency.

The plurality of scrambled RF television information signals is carried on an RF bus in the switching apparatus. The bus may consist of a plurality of cables. An RF switch connects a tuner to one of the cables. An amplifier is connected to the tuner. An amplitude information signal is decoded off the RF bus and is used for controlling gain of the amplifier. An up converter applies the output of the amplifier onto the assigned carrier frequency.

33 Claims, 7 Drawing Sheets

U.S. PATENT DOCUMENTS

| | | | |
|---|---|---|---|
| 4,769,838 | 9/1988 | Hasegawa | 380/7 |
| 4,801,190 | 1/1989 | Imoto | 350/96.16 |
| 4,827,511 | 5/1989 | Masuko | 380/15 |
| 4,829,372 | 5/1989 | McCalley et al. | 358/86 |
| 4,864,613 | 9/1989 | Van Cleave | 380/10 |
| 4,903,126 | 2/1990 | Kassatly | 358/146 |
| 4,920,566 | 4/1990 | Robbins et al. | 380/19 |
| 4,922,532 | 5/1990 | Farmer et al. | 380/15 |
| 4,924,498 | 5/1990 | Farmer et al. | 380/15 |
| 4,947,244 | 8/1990 | Fenwick et al. | 358/86 |
| 4,975,771 | 12/1990 | Kassatly | 358/146 |
| 4,989,245 | 1/1991 | Bennett | 380/23 |
| 4,994,909 | 2/1991 | Graves et al. | 358/86 |
| 5,027,400 | 6/1991 | Baji et al. | 380/20 |
| 5,060,262 | 10/1991 | Bevins, Jr. et al. | 380/19 |
| 5,093,718 | 3/1992 | Hoarty et al. | 358/84 |
| 5,109,414 | 4/1992 | Harvey et al. | 380/9 |
| 5,133,009 | 7/1992 | Rumreich | 380/10 |
| 5,133,079 | 7/1992 | Ballantyne et al. | 455/4.1 |
| 5,142,575 | 8/1992 | Farmer et al. | 380/15 |
| 5,172,413 | 12/1992 | Bradley et al. | 380/20 |
| 5,191,410 | 3/1993 | McCalley et al. | 358/86 |
| 5,220,420 | 6/1993 | Hoarty et al. | 358/86 |
| 5,319,455 | 6/1994 | Hoarty et al. | 348/7 |
| 5,355,162 | 10/1994 | Yazolino et al. | 348/11 |
| 5,557,316 | 9/1996 | Hoarty et al. | 348/7 |

SWITCHED CHANNEL SYSTEM

The present application claims priority from U.S. Provisional Application No. 60/000,017, filed Jun. 8, 1995.

BACKGROUND OF THE INVENTION

The present invention is directed to a cable system for distributing television information signals. In particular, the present invention is directed to a channel routing system for RF scrambled television signals.

Many cable companies are hoping to be able to deliver a wide selection of TV programming to their subscribers. Widespread availability of pay-per-view or near-video-on-demand would be highly desirable. The costs involved in providing on the order of 500 channels through a cable to each and every household are enormous. Digital compression and digital set tops are not sufficiently available to supply such widespread programming within current budget constraints.

It is an object of the present invention to provide widespread choices of pay-per-view television and near-video-on-demand through presently available cable distribution systems.

SUMMARY OF THE INVENTION

The present invention is directed to a switched channel system. Each of a plurality of RF modulators are fed with a scrambled television information signal. Each of the signals is modulated at a different carrier frequency for placement on an RF bus or cable. A plurality of tuners, each capable of converting the carrier of a selected one of the scrambled television information signals to a predetermined intermediate frequency (IF), are coupled to the RF bus. A plurality of IF amplifiers, each connected to one of the tuners, applies a variable gain to the scrambled IF television signal. The amplified scrambled IF signal is provided to an up converter for transmitting at a selected RF frequency. When more than one RF bus is used, an RF switch may be provided in association with each of the tuners for selecting one of the buses for tuning.

The gain applied by an IF amplifier may be determined by any number of ways. In accordance with an embodiment of the invention, an unscrambled amplitude signal is carried on the RF bus along with each scrambled television information signal. In the preferred embodiment, the aural carrier frequency of the next lower TV channel could be used to carry an amplitude modulated signal representative of the signal level of the scrambled television information signal. As such, on the RF bus, only every other television channel carries a television information signal. At the output, the amplitude signal is received and used by the tuner to control the gain to be applied to the scrambled television information signal.

Instead of using a separate signal for amplitude information, a circuit may be provided to independently restore the sync signal to the scrambled television information signal for use in providing automatic gain control on the scrambled television information signal. In accordance with one embodiment for restoring the sync signal, color burst detection is performed. In accordance with a second embodiment for restoring the sync signal, the vertical blanking interval is detected.

Other objects and advantages of the invention will become apparent during the following description of the presently preferred embodiment of the invention taken in conjunction with the drawings.

DETAILED DESCRIPTION OF THE PREFERRED EMBODIMENTS

Figure 1:
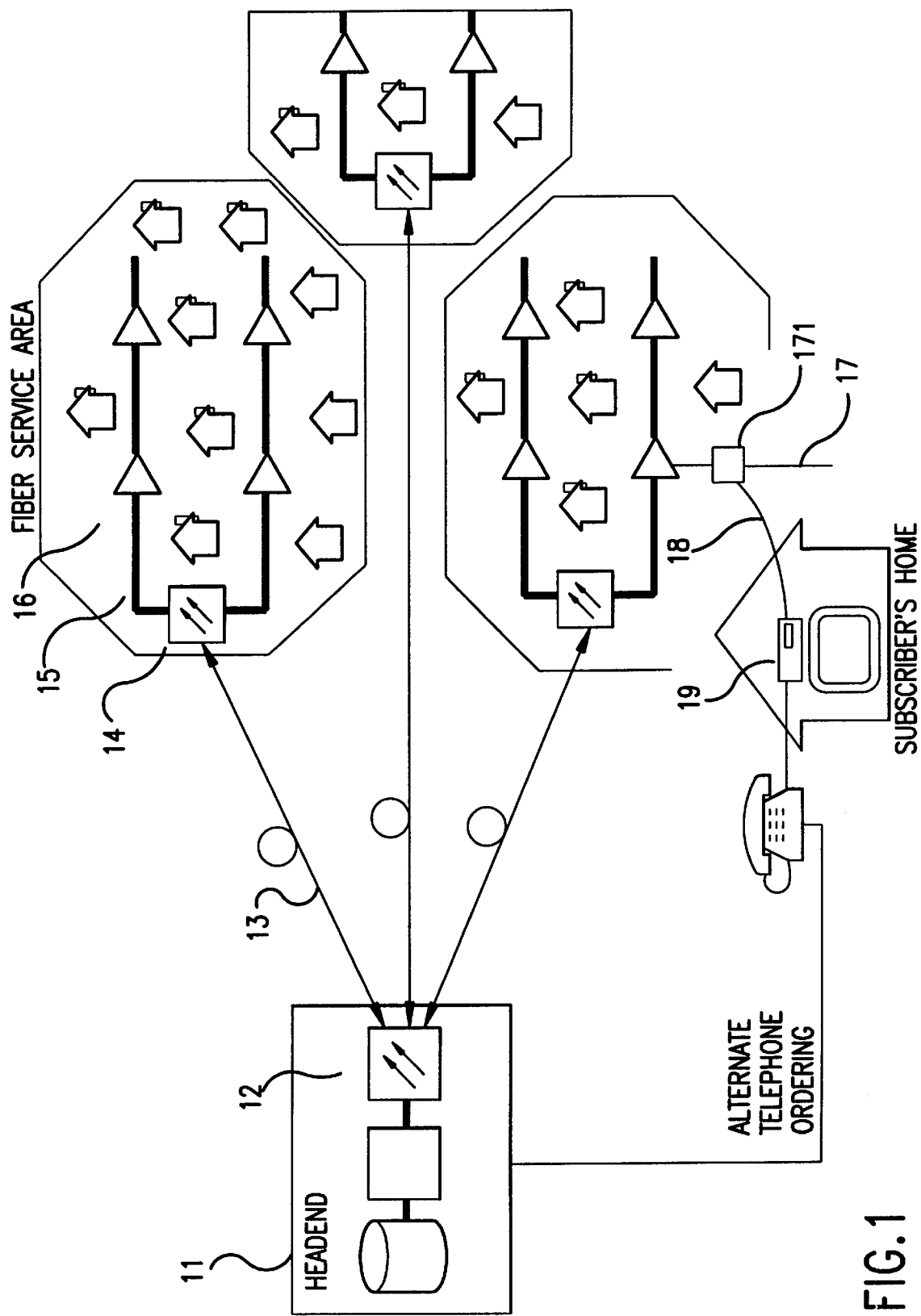
FIG. 1 is a block diagram of a cable tv distribution system.

Referring now to the drawings, FIG. 1 gives the overall layout for a cable television system. Analog television information signals are provided to a headend 11. A "television information signal" as used herein is any signal that may be utilized by a television for video display, regardless of the form, including a standard NTSC-modulated rf carrier, an MPEG-compressed digital data stream, or any other format. An "analog television information signal" is generally an NTSC-modulated rf carrier; however, other formats may be adopted for use. The system of FIG. 1 is shown for use with optical fiber cable 13. Other communication links may be substituted for the optical fiber. Television information signals are transmitted from the headend 11 to an optical transmitter 12. The information signals are optically transmitted along the fiber optic cable 13. The optical fiber cable 13 from transmitter 12 functions as a fiber trunk. At the end of the trunk an optical receiver 14 forwards the signals to a plurality of express trunks 15. Bridger amplifiers 16 serve to maintain a sufficiently strong signal along the express trunk. A feeder 17 carries the signals for a number of households on a street or neighborhood. A tap 171 provides a cable drop to serve several homes. Each individual subscriber has a subscriber cable 18 that is connected to a tap 171. Inside the home, a cable converter 19 is connected to the subscriber cable 18 and is used for providing television information signals to a subscriber's; television for viewing. For interactive cable systems where information from the subscriber is transmitted to the cable service, a data communication link is required. The data communication link may be provided by return signals through the cable distribution system or may be provided separately by a telephone line. One function of the data communication link may be selection of a video movie-on-demand or a pay-tv programming selection.

Figure 2:
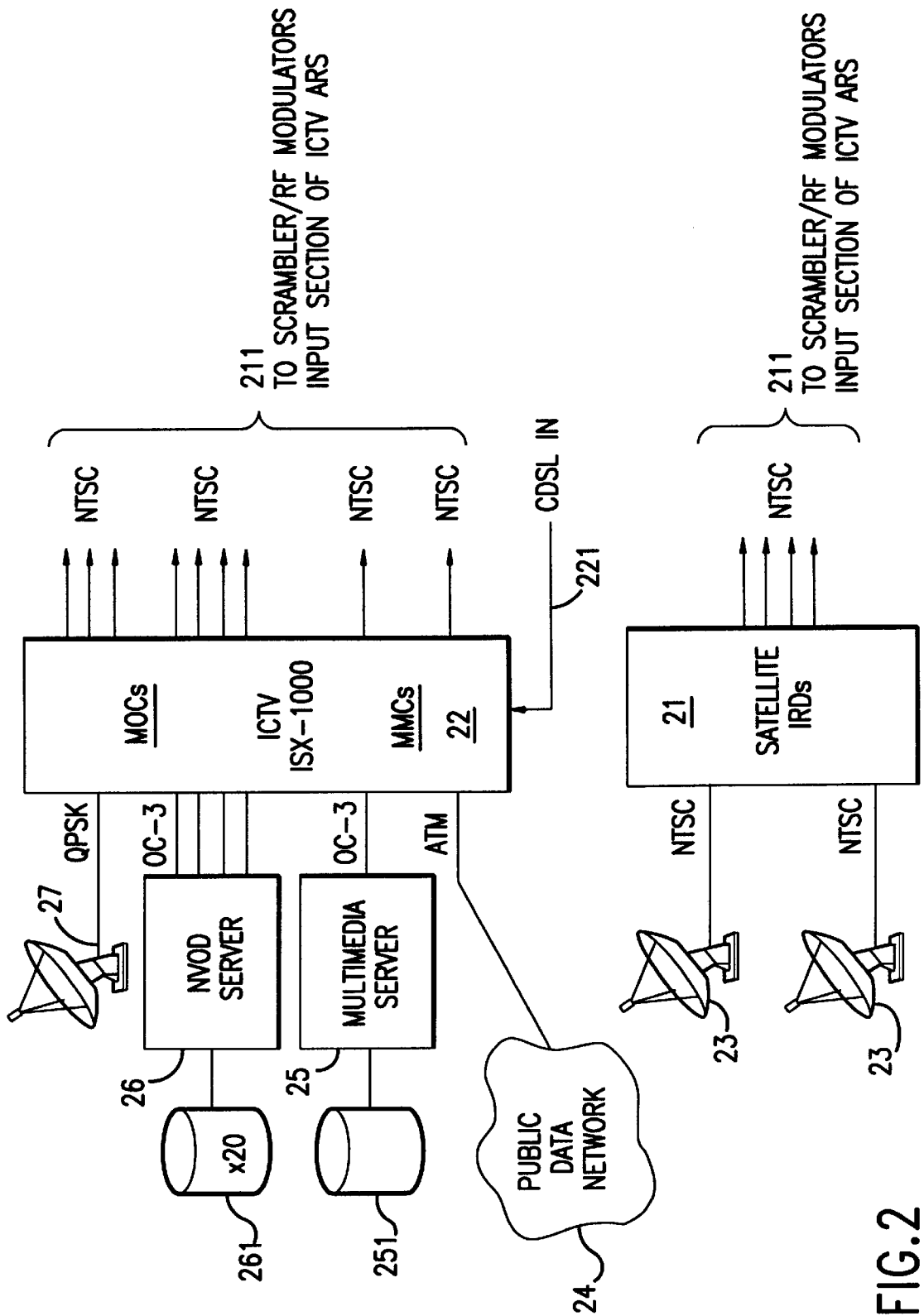
FIG. 2 is a block diagram of the input to a cable tv distribution system.

Numerous television information sources may provide analog television information signals to the headend 11. FIG. 2 illustrates a variety of information sources. Broadcast television signals, as well as interactive information services, may be received by a satellite antenna 23. Analog television signals are processed through individual integrated receiver-descramblers (IRD) 21. Data such as credit card and banking information may be provided through a public data network 24. A multimedia server 25 may be included for accessing interactive ads and information or educational applications stored on disk 251 or other digital storage media. An NTSC-output multimedia controller (MMC) accesses the server 25. The multimedia controller is connected to the server through a data communications link. Commands from subscribers are fed to an appropriate multimedia controller through a data communications link that may be provided by telephone or on a portion of the optical fiber bandwidth. The user commands are processed by the appropriate application running on the multimedia controller. Multimedia controllers (MMCs) and movie only controllers (MOCs) are explained in greater detail in International Patent Publication WO 93/22877, the full disclosure of which is hereby incorporated by reference herein.

Another server 26 functions to provide near-video-on-demand (NVOD). The NVOD server 26 processes movies stored on disks 261. The disk capacity is configured to hold the number of movies offered, for example, 20 or 25 movies. Each movie is read from its disk in fixed time offsets and outputted in a multiplexed stream from the NVOD server 26. If the movie-start offsets were programmed for every 15 minutes, the average length movie (105 minutes) would generate seven streams out of the server, simultaneously. The multiplexed digital streams are converted to analog NTSC signals by movie only controllers. The television information signals provided by the MPEG-only cards and the multimedia cards are provided to the headend 11.

Figure 3:
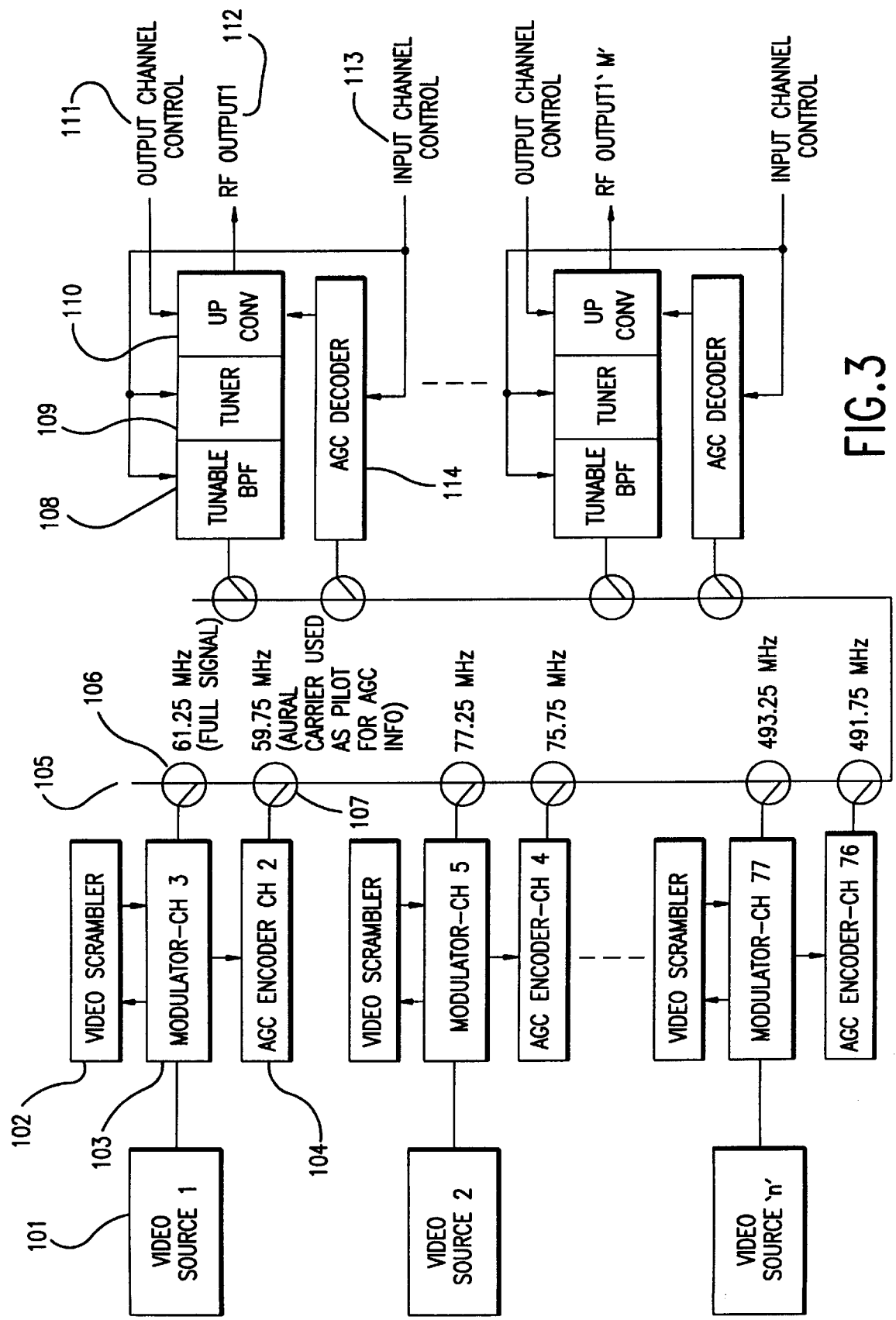
FIG. 3 is a block diagram of a first embodiment of a switched channel system of the present invention.

In accordance with the present invention, a switched channel system such as that shown in FIG. 3 is provided at the headend 11. Television information signals from video sources 101 are each provided to a modulator 103 which modulates at a given television channel and, with the aid of a scrambler 102, scrambles the inputted signal. Only every other television channel is used. In the embodiment shown, it is only the odd numbered channels that carry television information signals. Each scrambled television information signal is inserted onto an RF bus or cable 105 through a directional coupler device 106. In accordance with a presently preferred embodiment, an amplitude modulated signal representing signal level of the television information signal before scrambling is encoded by AGC encoder 104 onto an amplitude modulated carrier at the aural carrier frequency of the next lower television channel. By using an amplitude modulated carrier with an amplitude modulated signal, any losses or degradation of the signal during transmission equally effect the signal and the carrier reference. Thus accurate automatic gain control information is maintained. An advantage of using the adjacent lower channel aural carrier frequency is that most tuner circuits already include a tracking notch filter to tune out possible adjacent channel interference from the lower channel aural carrier. The cost of capturing the amplitude information is thus reduced by using an existing tuned circuit for retrieving the information. The encoded amplitude signal is inserted onto the RF bus 105 through a directional coupler 107. A plurality of RF buses 105 may be added to the system to increase the number of television signals that can be carried and switched by the system.

A subscriber utilizing the system requests one of the many scrambled and modulated television information signals. The subscriber's; request is assigned by a data processor, running a call setup program, to one of a plurality of output processors, each including a tunable band pass filter 108, a tuner 109 and an up converter 110. The data processor translates the subscriber's; request into a specific channel on the RF bus 105. The translated channel number is applied via an input channel control bus to the assigned tuner 109. An output channel is applied to the assigned up converter 110 to instruct the assigned converter to put the information signal on a selected RF carrier signal for sending to the requestor.

The input channel request to a tuner 109 is used to tune the associated band pass filter 108. The filter 108 reduces adjacent channel interference which would otherwise overload the tuner 109. The input channel also tunes the tuner 109 to the appropriate center frequency of the desired program. In addition, in accordance with the presently preferred embodiment of the invention, the input channel tunes an AGC decoder 114 to capture the automatic gain control information from the amplitude modulated carrier placed on the RF bus by an AGC encoder 104. The tuner uses the AGC information to restore an appropriate amplitude to the scrambled television information signal. Accurate amplitude information is critical because the tuner 109 cannot determine amplitude from the scrambled signal itself. The sync tip has been attenuated and frequency dependent signal losses have occurred through the coaxial RF cable 105. The amplified scrambled television information signal is translated in frequency by the up converter 111 to the assigned output frequency. The resulting signal is put on output cable 112 which will carry the television information signal from the headend to the subscriber's; home.

Figure 4:
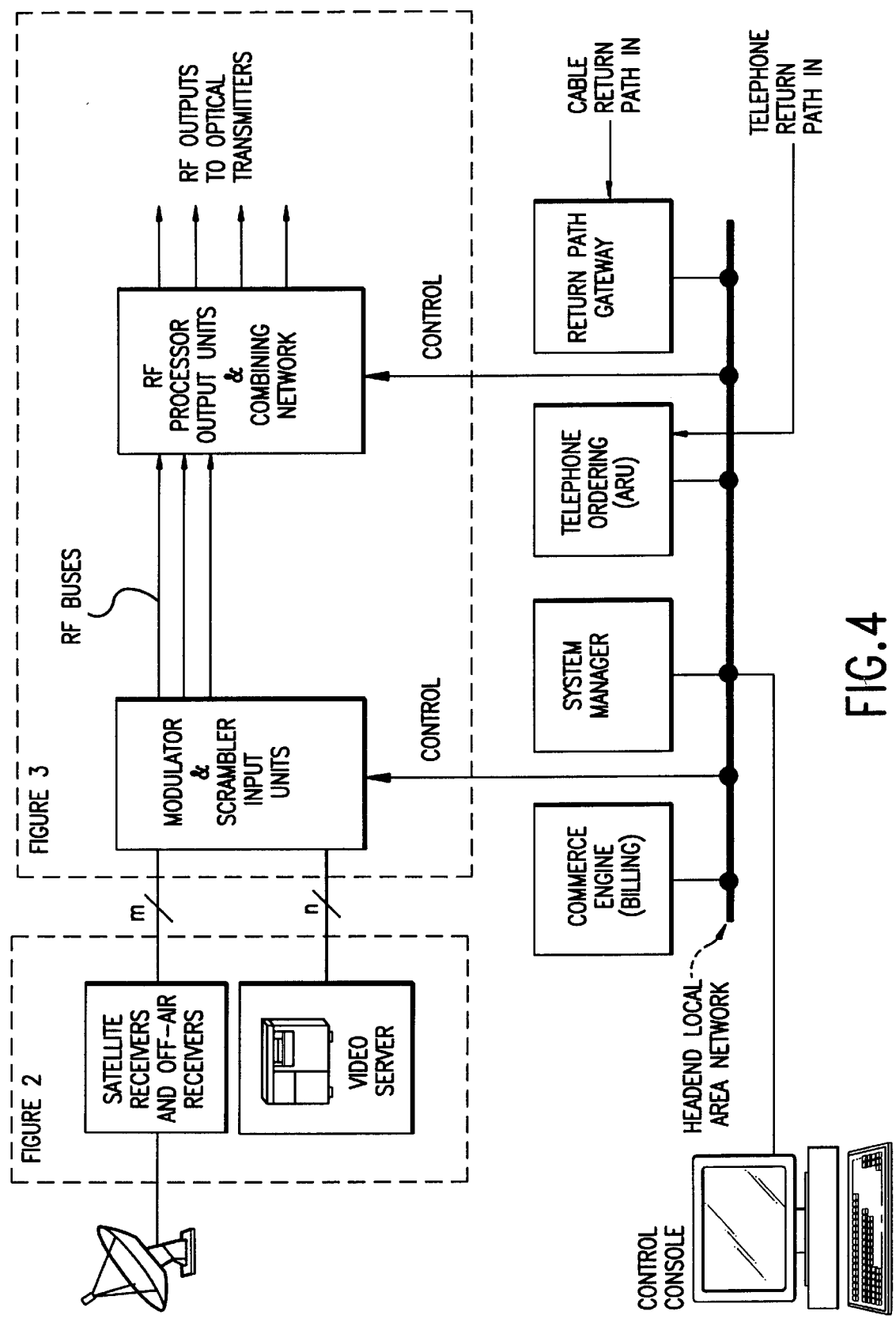
FIG. 4 is a block diagram of a switched channel system along with its television and control inputs.

Referring now to FIG. 4, the switched channel system is illustrated in context. The television information signals are provided by any number of inputs illustrated in FIG. 2 including satellite receivers, cable receivers and video and multimedia servers. The television information signals are scrambled, modulated and placed on an RF bus. The headend local area network provides control signals for controlling the activity of the switched channel system. Control communications with the modulator and scrambler units keep track of and determine which television information signals are being modulated to which channels and which buses. The RF processor output units of the switched channel system are provided input channel and output channel control signals by the headend local area network. Subscribers may communicate with the headend either through a cable return path or a telephone.

Figure 5:
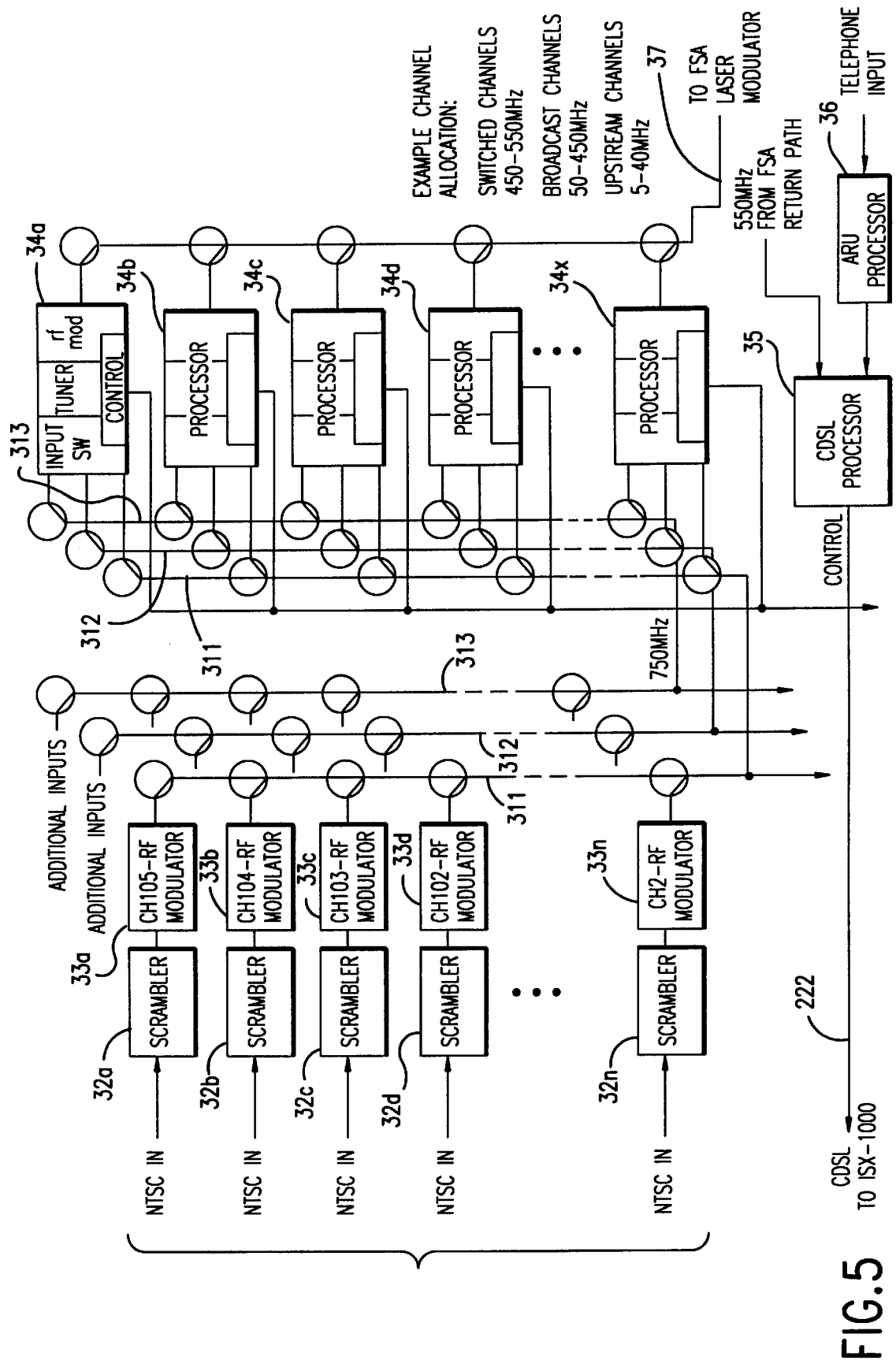
FIG. 5 is a block diagram of an alternate embodiment of a switched channel system of the present invention.

An alternate embodiment of the invention shall now be described with respect to FIGS. 5–7. The television information signals are each provided to a scrambler 32a–n. Any conventional scrambling algorithm that includes sync suppression may be implemented by the scramblers. Each scrambler is connected to an RF modulator 33a–n. Each of the RF modulators puts the scrambled television information signal on a different carrier frequency. For example, as shown in FIG. 5, the RF modulators separate the television information signals on channels 2 through 105. All 104 channels of television information signals can be carried on a single cable 311. A plurality of cables may be added to the switched channel system to multiply the number of television signals that can be carried and switched by the system. In accordance with the embodiment of FIG. 5, three cables, 311, 312, 313 are shown. The channels 2 through 105 can be repeated on each of the cables with different information sources being input on a same channel but different cable. Thus by using three cables, the number of television information signals switched by the system is tripled. The embodiment of FIG. 5 uses a cable that has a 750 MHZ bandwidth. The cables 311, 312, 313 may be referred to as an RF bus. The RF bus carries scrambled television information signals.

A plurality of processors are provided as an output section from the switched channel system. A data processor 35 is in data communication with the subscribers to the cable system. The data processor 35 assigns a requesting subscriber to one of a plurality of output processors 34. The data communications with the data processor 35 may be through a telephone automated response unit (ARU) or a return path on the optic fiber trunk. The data processor 35 selects the desired information source and instructs the assigned processor to put the information source on a selected RF carrier signal for sending to a subscriber.

Each processor 34 includes a tuner for picking off the desired information signal from the RF bus. When the RF bus consists of more than one cable, each processor includes an input switch. The input switch selects the cable from among the plurality of cables in the RF bus that is carrying the desired television information signal. The desired cable is connected to the tuner which picks off the channel with the television information signal desired by the subscriber.

The information signal on the channel is modulated by an RF modulator to an RF frequency for delivery to the subscriber. The processor 35 informs the cable converter 19 at the subscriber's; home as to which frequency the desired signal will be found.

The output cable 37 carries the modulated information signals from the processors 34. The output cable may be used in whole or in part for the switched channels. It may be desirable to provide broadcast channels that are made available to all subscribers at all times over a substantial portion of the output cable bandwidth. A smaller portion of the bandwidth may be reserved for use by the switched channels. By statistically determining peak simultaneous usage for a group of subscribers, the number of processors that are required for any given group may be minimized to handle the expected peak use. It is not necessary to have one processor for each subscriber since simultaneous usage by all subscribers of the switched channels is unlikely. The switched channels on the output cable may be limited to an allotted frequency band. If there is room for only twenty channels on the output cable, the output cable might service over a hundred subscribers where the peak demand is not expected to be more than 20 simultaneous users. Another output section in the switched channel system may be provided with its own output cable to service another group of over a hundred subscribers. While each output cable only carries 20 switched channels, each subscriber nevertheless has access to a selection of over 300 channels input into the switched channel system.

It is an FCC requirement for cable television systems that the signal strength of adjacent channels made available to a subscriber not vary by more than 2 dB. Therefore, a gain control is required to provide the desired signal strength to any switched channel placed on the output cable 37. Automatic gain control is made difficult in the switched channel system because the signals are scrambled. The scrambled signals have their sync signal suppressed. For conventional or automatic gain control to operate, the peak-to-peak amplitude of the signal including the sync signal is required. In accordance with the alternate embodiment of the invention, sync is restored to the scrambled signal only for the purpose of performing automatic gain control. The scrambled signal is switched by the switched channel system and delivered at proper gain. An advantage of the present invention is that scrambling only need be accomplished once.

Figure 6:
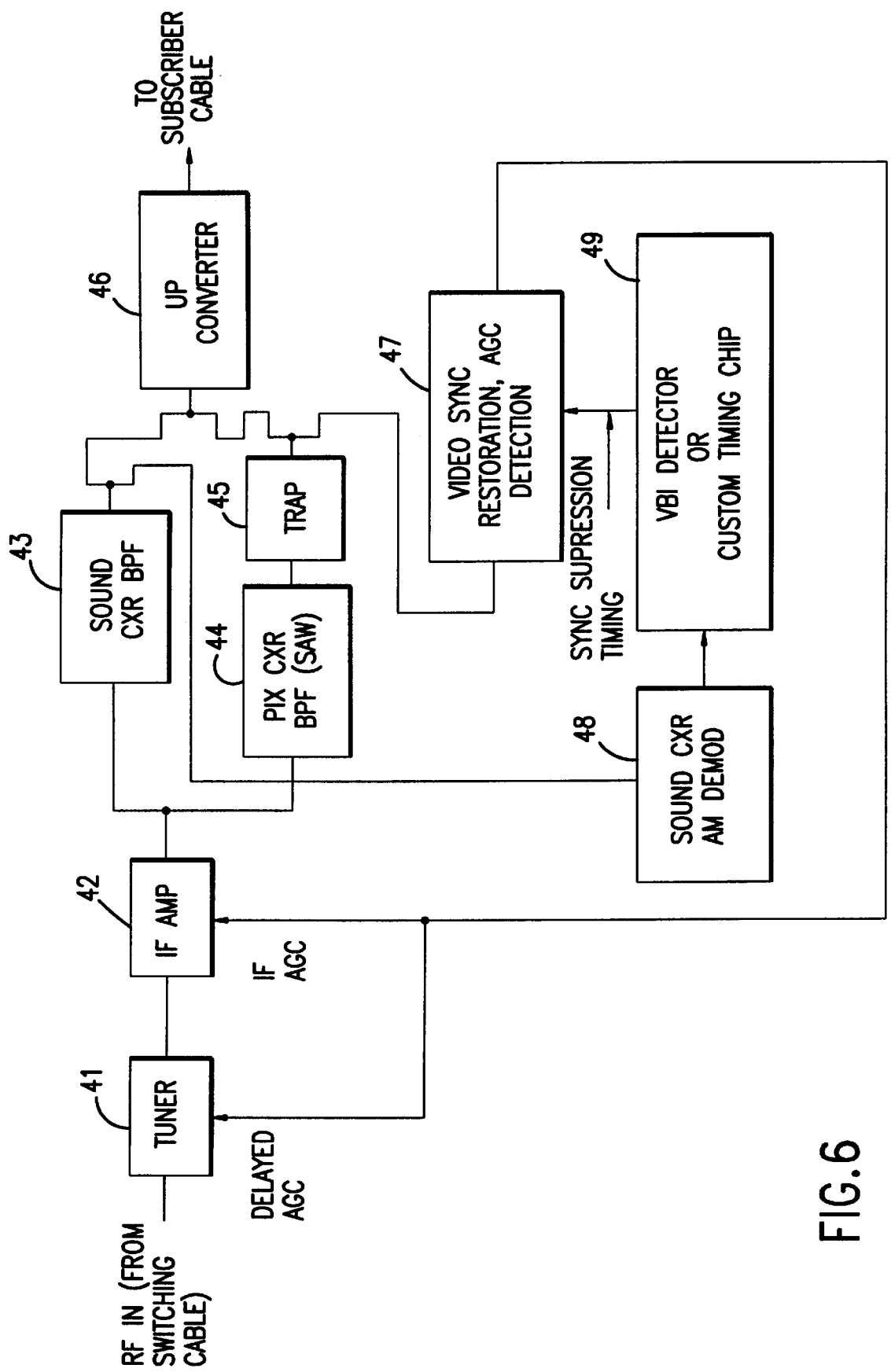
FIG. 6 is a block diagram of an embodiment of an automatic gain control circuit for use in the switched channel system of FIG. 5.

Referring to FIG. 6, one embodiment for restoring the sync signal to the scrambled IF signal for the purpose of automatic gain control is shown. The circuit of FIG. 6 is for use in a single processor 34 of the switched channel system. The tuner 41 is connected to an IF amplifier 42. The embodiment of FIG. 6 makes use of the vertical blanking interval to identify and restore the sync signal. It is desirable to eliminate adjacent channel energy from being coupled to the subscriber cable. For this purpose, a high quality IF SAW filter 44 is used. Such a filter generally does not pass the sound carrier. In such cases, a sound carrier trap 45 is also included and a separate path is provided for the sound with its own bandpass filter 43. The output of the sound CXR bandpass filter 43 is provided to a sound CXR AM demodulator 48. This is connected to a vertical blanking interval (VBI) detector 49 for identifying the vertical blanking interval from the sound signal. This provides the timing for locating the suppressed sync signal. The video sync is restored for the purposes of automatic gain control in block 47. The output signal to up converter 46 remains scrambled and is delivered at an appropriate gain level. The up converter 46 is the RF modulator, modulating the selected information signal at the carrier frequency assigned to the subscriber.

Figure 7:
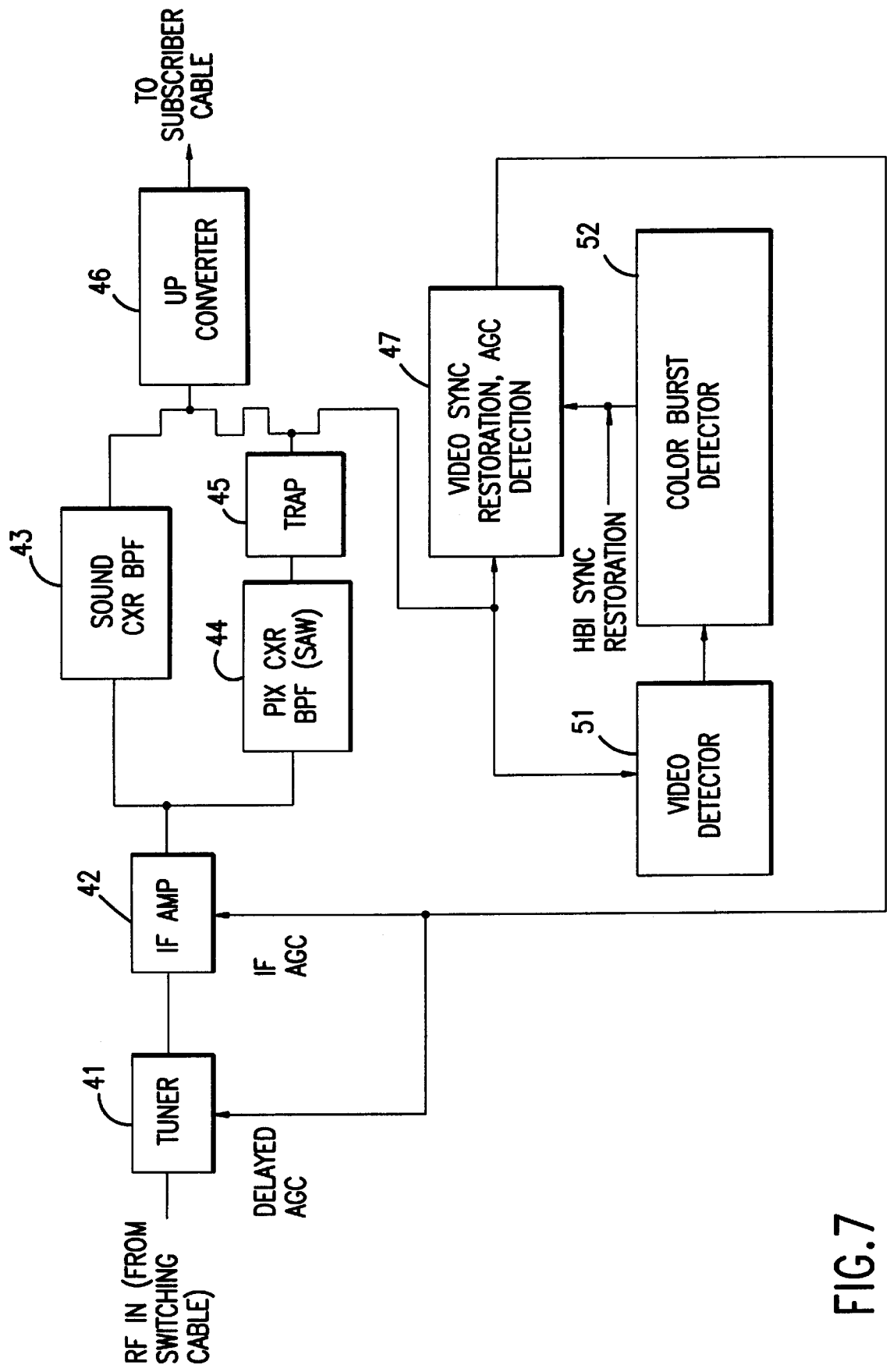
FIG. 7 is a block diagram of an alternate embodiment of an automatic gain control circuit for use in the switched channel system of FIG. 5.

The embodiment of FIG. 7 is similar to that in FIG. 6 except that color burst is used to identify the timing of the sync signal instead of using the vertical blanking interval.

We claim:

1. An RF scrambled signal switch comprising:
   bus means for carrying a plurality of scrambled RF television information signals, said scrambled RF television information signals each having a suppressed synchronization signal;
   receiving means for receiving a signal selecting one of said scrambled RF television information signals;
   processor means, connected to said receiving means, for identifying the selected scrambled RF television information signal and for selecting one of a plurality of RF output carrier frequencies; and
   means, coupled to said processor means and said bus means, for outputting the selected scrambled RF television information signal on the selected RF output carrier.

2. The switch of claim 1 wherein said carrying means comprises an RF bus.

3. The switch of claim 2 wherein said RF bus comprises a plurality of cables.

4. The switch of claim 3 wherein said outputting means comprises a tuner and an RF switch for connecting said tuner to one of said cables.

5. The switch of claim 1 wherein said outputting means comprises a tuner and an up converter responsive to said processor means.

6. The switch of claim 1 wherein said bus means further carries an amplitude information signal for each scrambled RF television information signal.

7. The switch of claim 6 further comprising a decoder means, connected to said outputting means, for receiving the amplitude information signal.

8. The switch of claim 7 wherein said outputting means includes means for amplifying the scrambled RF television information signal responsive to the amplitude information signal.

9. The switch of claim 6 wherein said bus means carries the amplitude information signal on an amplitude modulated carrier signal.

10. The switch of claim 9 wherein the amplitude modulated carrier signal is an aural carrier frequency for a channel lower and adjacent to the scrambled RF television information signal.

11. A switched channel system comprising:
    a plurality of RF modulators, each producing a modulated scrambled television information signal;
    a plurality of encoders, each associated with an RF modulator to produce an amplitude information signal;

an RF bus for carrying modulated scrambled television information signals provided by said plurality of RF modulators amplitude information signals provided by said plurality of encoders;

a plurality of tuners coupled to said RF bus;

a plurality of decoders, each associated with one of said tuners, for receiving the amplitude information signal associated with a modulated scrambled television information signal received by an associated tuner;

means for amplifying the modulated scrambled television information signal in response to the amplitude information signal; and an up converter for modulating the amplified signal at a selected RF frequency.

12. The switched channel system of claim 11 wherein said RF bus comprises a plurality of cables and said switched channel system further comprises a plurality of RF switches, each RF switch being coupled between said plurality of cables and one of said tuners.

13. The switched channel system of claim 11 wherein said RF bus carries said amplitude information signals on amplitude modulated carriers.

14. The switched channel system of claim 13 wherein the amplitude modulated carriers comprise aural carrier frequencies.

15. A method for routing one of a plurality of RF television information signals onto a selected RF frequency comprising the steps of:

modulating and scrambling each of said RF television information signals;

transmitting the modulated scrambled RF television information signals on an RF bus;

tuning into one of said modulated scrambled RF television information signals on the RF bus onto an intermediate frequency;

amplifying the scrambled IF television information signal;

controlling gain in said step of amplifying in response to automatic gain control information corresponding to the one of said modulated scrambled RF television information signals; and modulating the amplified scrambled IF television information signal onto the selected RF frequency.

16. The method of claim 15 wherein the rf bus comprises a plurality of cables and further comprising switching a tuner into connection with one of said cables and wherein said step of tuning is performed by the tuner.

17. The method of claim 15 wherein said step of controlling gain comprises decoding an amplitude modulated amplitude information signal on the RF bus corresponding to the one of said modulated scrambled RF television information signals.

18. An RF scrambled signal switch comprising:

at least one line carrying a plurality of scrambled RF television information signals;

a data communication receiver connected to receive a signal selecting one of said scrambled RF television information signals;

a processor connected to said receiver for identifying the selected scrambled RF television information signal and for selecting one of a plurality of RF output carrier frequencies;

a tuner, coupled to said processor and said at least one line, for tuning to the selected scrambled RF television information signal; and a modulator, coupled to said tuner, for placing the selected scrambled RF television information signal on the selected RF output carrier.

19. The switch of claim 18 further comprising a plurality of pairs of said tuners and said modulators, each pair being individually assigned to a correspondingly selected scrambled RF television information signal.

20. The switch of claim 18 wherein said at least one line comprises a plurality of RF cables.

21. The switch of claim 20 further comprising an RF switch, responsive to said processor, for connecting said tuner to one of said cables.

22. The switch of claim 18 wherein said at least one line further carries an amplitude information signal for each scrambled RF television information signal.

23. The switch of claim 22 further comprising a decoder, coupled to said tuner for receiving the amplitude information signal of the selected scrambled RF television information signal.

24. The switch of claim 23 further comprising an amplifier, coupled between said tuner and said modulator, for amplifying the selected scrambled RF television information signal responsive to the amplitude information signal received by said decoder.

25. The switch of claim 22 wherein said at least one line carries the amplitude information signal on an amplitude modulated carrier signal.

26. The switch of claim 25 wherein the amplitude modulated carrier signal is an aural carrier frequency for a channel lower and adjacent to the scrambled RF television information signal.

27. An RF scrambled signal switch comprising:

an RF bus, including a plurality of cables, carrying a plurality of scrambled RF television information signals;

receiving means for receiving a signal selecting one of said scrambled RF television information signals;

processor means, connected to said receiving means, for identifying the selected scrambled RF television information signal and for selecting one of a plurality of RF output carrier frequencies; and means, coupled to said processor means and said bus means, for outputting the selected scrambled RF television information signal on the selected RF output carrier, said outputting means comprising a tuner and an RF switch for connecting said tuner to one of said cables.

28. An RF scrambled signal switch comprising:

bus means for carrying a plurality of scrambled RF television information signals;

receiving means for receiving a signal selecting one of said scrambled RF television information signals;

processor means, connected to said receiving means, for identifying the selected scrambled RF television information signal and for selecting one of a plurality of RF output carrier frequencies; and means, coupled to said processor means and said bus means, for outputting the selected scrambled RF television information signal on the selected RF output carrier, said outputting means comprising a tuner and an up converter responsive to said processor means.

29. An RF scrambled signal switch comprising:

bus means for carrying a plurality of scrambled RF television information signals;

receiving means for receiving a signal selecting one of said scrambled RF television information signals;

processor means, connected to said receiving means, for identifying the selected scrambled RF television information signal and for selecting one of a plurality of RF output carrier frequencies;

means, coupled to said processor means and said bus means, for outputting the selected scrambled RF television information signal on the selected RF output carrier; and wherein said bus means further carries an amplitude information signal for each scrambled RF television information signal.

30. The switch of claim 29 further comprising a decoder, connected to said outputting means, for receiving the amplitude information signal.

31. The switch of claim 30 wherein said outputting means includes means for amplifying the scrambled RF television information signal responsive to the amplitude information signal.

32. The switch of claim 29 wherein said bus means carries the amplitude information signal on an amplitude modulated carrier signal.

33. The switch of claim 32 wherein the amplitude modulated carrier signal is an aural carrier frequency for a channel lower and adjacent to the scrambled RF television information signal.

* * * * *

UNITED STATES PATENT AND TRADEMARK OFFICE
CERTIFICATE OF CORRECTION

PATENT NO. : 5,812,665
DATED : September 22, 1998
INVENTOR(S) : W. Leo Hoarty, Gary M. Lauder, Ted E. Hartson It is certified that error appears in the above-identified patent and that said Letters Patent is hereby corrected as shown below:

On the face of the patent, please insert the priority information as follows:

Related U.S. Application Data

[60] Provisional application No. 60/000,017, Jun. 8, 1995.

Signed and Sealed this

Fifteenth Day of December, 1998

Attest:

BRUCE LEHMAN

Attesting Officer

Commissioner of Patents and Trademarks